Oct. 13, 1959   D. A. KIFFER ET AL   2,908,283
DISC VALVE AND ASSEMBLY
Filed July 11, 1955
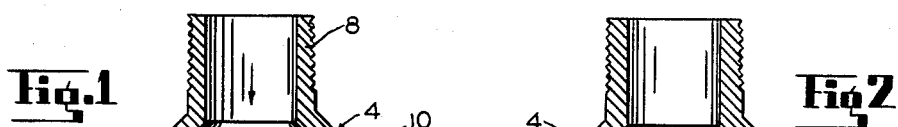
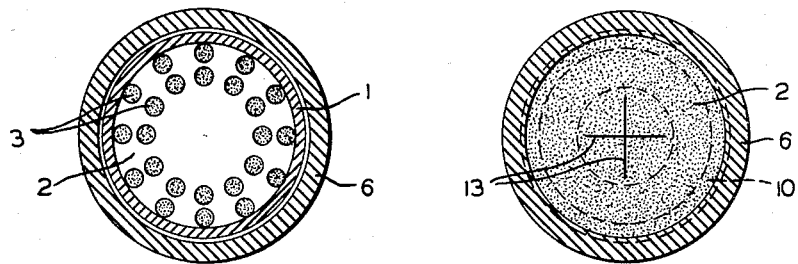
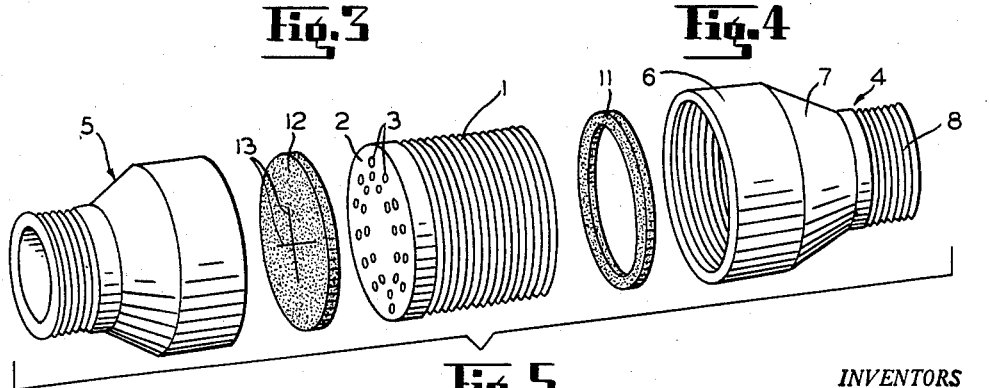
INVENTORS
DESIRE A. KIFFER
LAWRENCE D. ORSER
BY
ATTORNEYS United States Patent Office 2,908,283
Patented Oct. 13, 1959

2,908,283

DISC VALVE AND ASSEMBLY

Desire A. Kiffer, Waterloo, and Lawrence D. Orser, Cedar Falls, Iowa, assignors to Chamberlain Corporation, Waterloo, Iowa, a corporation of Iowa Application July 11, 1955, Serial No. 521,329

2 Claims. (Cl. 137—269.5)

This invention relates to improvements in a disc valve and assembly, and more particularly to a disc valve and valve assembly highly desirable for use as a check valve, or one way valve, although the invention will have other uses and purposes as will be apparent to one skilled in the art.

In the past, many and various one way and check valve assemblies including particular valve elements have been developed, but have been subject to one or more objections including high cost of manufacture, slow action, difficulty in making repairs or needed replacements when one part becomes out of order, difficulty in installing, and the valve assembly could not readily be adjusted for controlling the flow of fluid in a reverse direction. Also, in most cases, valve assemblies heretofore known, of the type of a one way or check valve, incorporated heavy gravity closing elements or required the use of springs. Consequently, when a part of the element, particularly the valve or valve seat became out of order, it was necessary for a repair man to acquire a particular or special part to fit that valve assembly before a repair could be made, or else substitute an entirely new valve assembly for the one needing attention.

With the foregoing in mind, it is an important object of the instant invention to provide a valve assembly that is extremely simple in construction, easily put together, and very economical.

Also an object of the invention is the provision of a valve assembly of the check valve or one way valve type, and wherein control of fluid in the opposite direction may easily be effected by the simple expedient of opening the assembly and reversing the interior parts.

Still another feature of the instant invention resides in the provision of a simple form of valve assembly, wherein both end portions of the assembly are identical.

It is also a feature of the invention to provide a valve assembly of the one way or check valve type, and wherein the valve element is self-responsive to a reduction in pressure to prevent the passage of fluid, and without the aid of gravity or special pressure means.

A further object of the invention resides in the provision of a valve assembly of the one way or check valve type, and wherein in the event the valve element itself becomes injured, a repair man may readily cut one from any handy piece of resilient material, such as rubber or synthetic rubber, and install the hand-made element in lieu of the damaged one.

It is a further object of the invention to provide a valve element in the form of a substantially flat resilient disc, having a self-closing opening in the central portion thereof.

Another feature of the invention resides in the provision of a simple form of valve element comprising a resilient substantially flat piece having a cross-slit in the central portion thereof which is closed when the piece is substantially flat, and which is open when the piece is centrally bulged.

While some of the more salient features, characteristics and advantages of the instant invention have been above pointed, others will become apparent from the following disclosures, taken in conjunction with the accompanying drawing, in which—

Figure 1 is a central vertical sectional view through a valve assembly embodying principles of the instant invention, showing the valve element in an opened position;

Figure 2 is a view similar to Fig. 1, but showing the valve element in closed position;

Figure 3 is a bottom plan sectional view taken substantially as indicated by the line III—III of Fig. 1, looking in the direction of the arrows;

Figure 4 is a top plan sectional view taken substantially as indicated by the line IV—IV of Fig. 2; and Figure 5 is an exploded isometric projection of the entire assembly.

As shown on the drawings:

The illustrated embodiment of the instant invention includes a tubular member or body part in the form of an externally threaded nipple 1. Closing one end of the body member 1 is a plate 2 having one or more annular rows of apertures 3 in the circumferential marginal portion of the plate, leaving the central portion of the plate solid or imperforate. The plate may be secured to the member 1 in any suitable manner, either welded or brazed inside the end of the member, as illustrated, or it may be set over the member.

Removably threaded to each end of the body member 1 is a hollow cap member or adaptor, these elements being indicated in general by numerals 4 and 5. The adaptors 4 and 5, in the illustrated instance, are identical in construction, which is the preferred form, although that is not essential for the operation of the mechanism. From the showings in Figs. 1 and 2 particularly, it will be seen that each adaptor 4 or 5 includes an expanded end portion 6, internally threaded for engagement over the body portion, and which end portion has a tapering part 7 terminating in an externally threaded connecting nipple 8, of less diameter than the remainder of the adaptor and of less diameter than the body member 1. This arrangement provides a hollow 9 inside the adaptor, and at the upper end of that hollow there is an annular inside shoulder 10 which may function as a gasket or valve seat.

Inside the shoulder 10 of the adaptor 4 and over the end of the body member 1 is a gasket 11 to provide a fluid tight seal between the adaptor and body member. In the same position on the shoulder 10 of the adaptor 5, and also overlying the circumferential edge of the body member 1 is a valve element 12. This valve element is a piece of resilient material, such as rubber, synthetic rubber, or an equivalent substance, and in the illustrated instance is shown in the form of a disc, because the associated parts are cylindrical. The valve element is substantially flat, and inherently tends to remain substantially flat. The element is solid except for a cross-slit 13 in the central portion thereof. It is not absolutely essential that the slit be in the form of a cross, since in some cases a straight slit is sufficient without a further cut at right angles thereto. In the illustrated instance, however, I have illustrated a preferred form of cross-slit of the shape of a plus sign or Greek cross. Preferably, the cut is a fine line severance so as to be closed, as illustrated in Figs. 4 and 5, when the valve element is in a substantially flat condition.

In operation, the instant invention is extremely simple. It is an easy and economical operation to insert the gasket 11 in the adaptor 4, and then threadedly engage the adaptor with the body 1. It is also an extremely simple operation to place the valve element either over the plate 2, or in the adaptor 5, and threadedly engage that adaptor over the opposite end of the body part 1. In that position, the device is completely assembled.

Looking at Fig. 1, and assuming that the connecting nipples 8—8 are incorporated in a fluid line, such as a pump line for example, and fluid is to flow in the direction indicated by the arrows, it will be noted that the valve element 12, responsive to the pressure of the fluid, expands or bulges in the central portion so as to open the slit 13 and permit the fluid to pass.

However, if the pressure becomes equal or greater on the opposite side of the valve element, as indicated by the arrow in Fig. 2, the valve element promptly assumes its substantially flat position against the plate 2, and the fluid is precluded from passing in that direction. It will be noted that the slit in the valve element is preferably of such size as to overlie the imperforate central portion of the plate, which facilitates the valve element blocking a flow of fluid in the reverse direction.

The valve element 12 due to its inherent tendency to assume a substantially flat condition, and due to variations in pressure on the opposite side thereof is highly suitable for use in a pulsating pump line, wherein upon a pressure pulsation in the direction of the arrows of Fig. 1, the valve will centrally bulge, permitting fluid to pass through the apertures 3 in the plate 2, thence over the surface of the valve element and through the slit 13. In between pulsations, the valve will assume a flat position and block any return flow. The valve is sufficiently flexible that such pulsations may occur with great rapidity.

Now it will be noted that should the valve element itself become injured, it is a simple expedient for a repair man to take a piece of scrap rubber or the like, cut out a piece to fit on the shoulder 10 of the adaptor 5, cut a slit in the central portion of the element, and utilize that in lieu of the damaged valve element. There is no necessity for the repair man to wait for a special element to arrive, or no necessity to substitute an entirely new valve assembly so that operation may be continued.

It will also be especially noted that should it be desired for any reason to change the direction of fluid flow, it is a simple expedient to disconnect the adaptor 5 from the body member 1, disconnect the body member 1 from the adaptor 4, reverse the body member, and interchange the valve element 12 and the gasket 11, and then connect the adaptors to the body part again. This can usually be accomplished without removing the valve assembly completely from the fluid line, although, if desired, the nipples 8—8 may be disconnected from the fluid line, the entire assembly reversed in position, and the nipples again connected. Either way, the operation is extremely simple and may be done expeditiously.

It will be further noted that the entire valve assembly and valve element itself are extremely durable, simple in construction, and economical to manufacture and use.

It will be understood that modifications and variations may be effected without departing from the scope of the novel concepts of the present invention.

We claim as our invention:

1. In a reversible one-way flow valve assembly; a pair of identical symmetrical cap members of elongated tubular form, each having a wide-mouthed cylindrical internally threaded inner end portion with a shoulder at the base of the threads, and a reduced diameter outer end portion; a cylindrical tubular member externally threaded on its opposite end portions and threadably reversibly engaged in the wide-mouthed inner end portions of said cap members and thereby spacing the cap members; said cap members and tubular member defining a stepped fluid passage therethrough; a plate integrally secured in closing relation in one end of said tubular member and having an annular series of apertures around a solid center portion; a resilient valve disk of rubber-type material lying in face-to-face relation against the outer face of said plate normally closing said apertures and having a self-closing slit opposing the solid center portion of the plate, said valve disk being of substantially the same diameter as said tubular member and having its margin secured by the closed end of the tubular member to the adjacent cap member shoulder and thereby forming a sealing gasket therewith; and annular seal means secured by the opposite and open end of said tubular member to the shoulder in the other of said cap members; a unidirectional flow being obtainable through either cap member by reversing with respect to the cap members the position of said tubular member and plate, said resilient disk and said annular seal means.

2. A valve assembly as defined in claim 1, wherein the cumulative cross-sectional area of said apertures is substantially equal to the cross-sectional area of the reduced outer end portion of each of said cap members.

References Cited in the file of this patent

UNITED STATES PATENTS

| 236,719 | Renton | Jan. 18, 1881 |
| 1,428,399 | Schilling | Sept. 5, 1922 |
| 1,745,304 | Lemex | Jan. 28, 1930 |
| 1,936,236 | Hill | Nov. 21, 1933 |
| 2,102,824 | White | Dec. 21, 1937 |
| 2,174,742 | Groeniger | Oct. 3, 1939 |
| 2,623,540 | Palermo | Dec. 30, 1952 |